Sept. 22, 1931.   C. R. SHORT   1,824,630
INTERNAL COMBUSTION ENGINE
Filed June 18, 1923
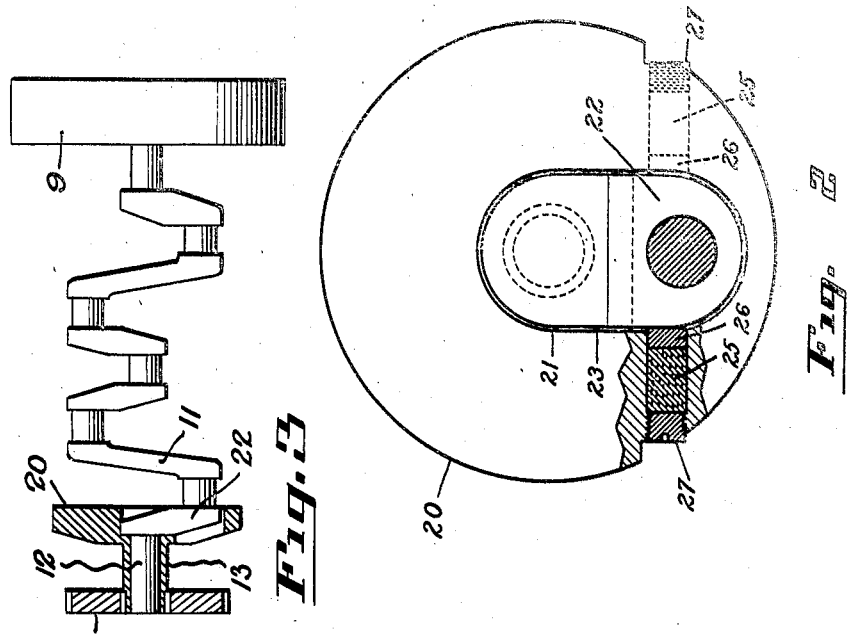
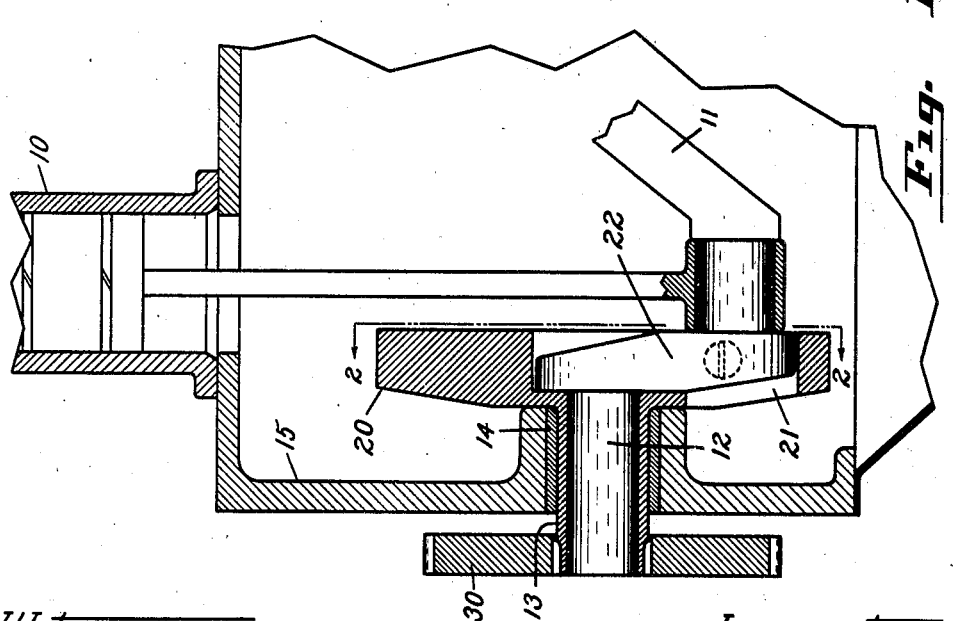
Witnesses
Wm. F. Pasco
Geo. E. Pasco
Inventor
Charles R. Short
By
Francis D. Hardesty
His Attorney Patented Sept. 22, 1931

1,824,630

UNITED STATES PATENT OFFICE

CHARLES R. SHORT, OF DAYTON, OHIO, ASSIGNOR, BY MESNE ASSIGNMENTS, TO PACKARD MOTOR CAR COMPANY, OF DETROIT, MICHIGAN, A CORPORATION OF MICHIGAN

INTERNAL COMBUSTION ENGINE

Application filed June 18, 1923. Serial No. 646,041.

This invention relates to means for reducing or eliminating the harmful effects of torsional vibrations in a rotating shaft and is especially applicable to the crank shaft of multicylinder internal combustion engines, particularly high speed engines having four or more cylinders.

Ordinarily the crank shaft of an internal combustion engine has a flywheel at only one end thereof and this flywheel is of necessity placed a considerable distance from the most distant crank pin in a multicylinder engine. Therefore when this most distant crank pin receives the power impulse from its piston, torque will be transmitted through the entire length of the crank shaft back to the heavy flywheel and since the polar inertia of the crank shaft is small compared to that of the flywheel the shaft will yield to the torsional stress a slight amount. In other words, the flywheel tends to hold that end of the crank shaft relatively stationary while the power impulse on the crank pin twists the shaft. Of course the same effect occurs with all of the crank pins to some degree but the greater the distance from the crank pin to the flywheel the greater will be the twisting due to the power impulses. Since the crank shaft is made of highly elastic material these twisting impulses set up torsional vibrations in the shaft, the natural frequency of which of course depends upon the design of the shaft itself, according to the well known laws of a torsional pendulum. The flywheel having a substantially uniform angular velocity serves as a relatively stationary point of support of a torsional pendulum, while the mass of the parts of the crank shaft, itself, and its appurtenances such as counterweights, acts as an oscillatory torsional pendulum having a very high frequency.

It has been found that at certain engine speeds the power impulses on the crank pins occur with substantially the same frequency or with substantially one half, one third, one quarter, etc., of the natural frequency of the torsional vibrations for any given crank shaft. When this occurs the power impulse as well as the forces of the inertia of the reciprocating parts will soon become substantially in phase with the torsional vibrations and so build them up to objectionable proportions according to the well known principle of resonance.

Now the object of this invention is to provide means to absorb the energy of torsional vibrations in a shaft and so prevent the vibrations from becoming objectionable at any speed.

Another object is to accomplish this result in a very simple manner when the invention is used for damping vibrations in a crank shaft by yieldably mounting an inertia mass, such as a crank counterweight, upon the crank shaft.

Another object is to utilize the inertia of the crank counterweight as well as the inertia of other wheels or gears which may be driven by the crank shaft to absorb the torsional vibrations without at the same time decreasing the frequency of these vibrations.

Further objects and advantages of the present invention will be apparent from the following description, reference being had to the accompanying drawings, wherein a preferred form of embodiment of the present invention is clearly shown.

In the drawings:

Fig. 1 shows in vertical section the front end of a multicylinder internal combustion engine embodying this invention;

Fig. 2 is a detail view taken on line 2—2 of Fig. 1, but showing certain parts in section, and Fig. 3 is a view in elevation of the engine crankshaft and fly-wheel assembly, showing the preferred, relative position of the inertia mass.

Similar reference characters refer to similar parts throughout the several views.

The particular engine illustrated more or less diagrammatically in the drawings, is a multicylinder internal combustion engine, only the front cylinder 10 of which is shown and having a crank shaft 11 provided with the usual flywheel 9 at the rear end. The engine may be of any conventional or desired design and may have the cylinders either arranged in line or at any desired angle.

The front end 12 of the crank shaft 11 is suitably mounted in a rotating bearing sleeve 13 which in turn is rotatably mounted in a stationary front bearing 14 suitably supported by the crank case 15. Rigidly secured to the inner end of sleeve 13, preferably by integral construction, is a suitable mass, shown in the form of an eccentrically weighted wheel 20, which preferably surrounds the crank arm and is rotatable with the crank shaft in the plane of the arm. This wheel 20 has a recess 21 therein in which the front crank arm 22 of the crank shaft fits loosely with a considerable clearance 23 at each side, so that the mass is movable relative to the crank shaft 11. The crank arm or throw 22 is yieldably held centrally of the recess 21 by yieldable damping members, such as small compressed cork inserts 25, held in suitable recesses in the wheel 20, being returned to its normal or central position after deflection therefrom by the resilience or expansibility of the yieldable members 25. Abutment members 26 of some suitable material which will not be squeezed out laterally in the clearance space 23 may be provided to properly retain the inserts 25 at their inner ends. The inserts 25 are retained at their outer ends and adjusted in position and compressed to the desired degree by the small screw plugs 27, all as will be clearly understood from Fig. 2. It will be obvious that as the crank shaft rotates it will also rotate the wheel 20, the drive being slightly yieldable due to the compressibility of the inserts 25. The outer end of sleeve 13 has rigidly fixed thereto by any suitable means the gear wheel 30 which may be used to drive the cam shaft, generator, magneto, pump, or any other engine device.

Now it will be seen that due to the yieldable drive between the crank shaft 11 and the weighted wheel 20, the torsional vibrations of shaft 11 will not be transmitted to the gear 30 and hence the noise, wear, etc., of the parts driven by the gear 30 will be greatly reduced.

Also, since at every torsional vibration of the crank shaft first one of the inserts 25 is compressed and then the other, the energy of these vibrations is quickly absorbed in internal friction in the material of the inserts 25. Therefore these vibrations will be continually damped and prevented from reaching objectionable proportions. The inserts 25 instead of being made of cork may be made of any suitable material which has the desired properties of yieldability and mechanical hysteresis, that is, it should have a considerable amount of internal friction between the molecules so that when it is made to yield by some force, a considerable part of the work done upon it is absorbed by the material itself; that is, transformed into some other form of energy, such as heat, which may be readily dissipated.

Various forms of fabric material may be used instead of cork, or fabric impregnated with rubber or other material. However, if any rubber is used in the material of the inserts it should be properly protected from oil which would have deleterious effects upon it.

The eccentricity of the weight of the wheel 20 is opposite to and serves as a counterweight for the crank arm. Of course when a counterweight is used for one crank throw a similar counterweight must also be used for a similar but opposite crank throw to preserve the proper balance of the entire crank shaft. The inertia of the rotating mass of wheel 20, together with the inertia of the gear 30 rigidly connected thereto will give a substantially constant angular velocity to wheel 20, regardless of the torsional vibrations in the crank shaft 11.

While the form of embodiment of the present invention as herein disclosed, constitutes a preferred form, it is to be understood that other forms might be adopted, all coming within the scope of the claims which follow.

What I claim is as follows:

1. In an internal combustion engine and in combination with the crank shaft thereof, and a crank case having an end wall; a rotating torsional vibration damping member located within said crank case and having a laterally extending tubular bearing sleeve rotatably supported in a bearing carried by said end wall, and through which sleeve one end of said crank shaft extends; and yieldable means whereby said rotating member is driven from said crank shaft.

2. In an internal combustion engine and in combination with the crank shaft thereof, and a crank case having an end wall; a rotating torsional vibration damping member located within said crank case and having a laterally extending tubular bearing sleeve rotatably supported in a bearing carried by said end wall, and through which sleeve one end of said crank shaft extends; and two yieldable shock absorbing members acting in opposition to one another and through which said crank shaft and said rotating member are coupled together so as to rotate in unison.

3. In an internal combustion engine and in combination with the crank shaft thereof, and a crank case having an end wall; a rotating torsional vibration damping member located within said crank case and having a laterally extending tubular bearing sleeve rotatably supported in a bearing carried by said end wall, and through which sleeve one end of said crank shaft extends; yieldable means whereby said rotating member is driven from said crank shaft; and a driving gear fastened to the outer end of said sleeve so as to be driven thereby.

4. In an internal combustion engine and in combination with the crank shaft thereof, and a crank case having an end wall; a rotating torsional vibration damping member located within said crank case and having a recess adapted to receive an arm or throw of said crank shaft, and also two other recesses arranged in alignment and at right angles to said first mentioned recess; and two yieldable shock absorbing members arranged within said last mentioned recesses and acting in opposition to another upon opposite sides of said crank arm.

5. In an internal combustion engine and in combination with the crank shaft thereof, and a crank case having an end wall; a rotating torsional vibration damping member located within said crank case and having a laterally extending tubular bearing sleeve rotatably supported in a bearing carried by said end wall, and through which sleeve one end of said crank shaft extends; and two yieldable shock absorbing members carried by said rotating member and acting in opposition to one another upon opposite sides of an arm or throw of said crank shaft.

6. In an internal combustion engine and in combination with the crank shaft thereof, and a crank case having an end wall; a tubular sleeve rotatably supported in a bearing carried by said end wall, and through which sleeve one end of said crank shaft extends; means including a yieldable member whereby the inner end of said tubular sleeve is driven from said crank shaft; a driving gear fastened to the outer end of said sleeve so as to be driven thereby; and a torsional vibration damping member carried by and rotatable with said sleeve.

7. Means for damping torsional vibrations in a shaft including, a rotating mass driven by said shaft in either direction through yieldable shock absorbing material, said rotating mass being so arranged as to act as a balance weight for said rotating shaft.

8. In an internal combustion engine having a crank shaft, in combination, a counterweight yieldingly secured to said shaft to permit a slight relative displacement therewith, and imperfectly elastic means to ordinarily retain said counterweight in its correct relative position upon said shaft whereby torsional vibrations in said shaft are eliminated.

9. In an internal combustion engine a crank shaft adapted to have a flywheel at one end thereof, in combination, a counterweight yieldingly secured to said shaft substantially opposite the crank throw most distant from said flywheel to permit a slight relative displacement therewith, and imperfectly elastic means to ordinarily retain said counterweight in its correct relative position upon said shaft whereby torsional vibrations in said shaft are eliminated.

10. In an internal combustion engine having a crankshaft adapted to have a fly-wheel at one end thereof, in combination, a counterweight, and means whereby said counterweight is yieldably mounted upon said shaft beyond the most distant crank pin from said fly-wheel, said yieldable mounting means being provided with shock absorbing means which permit only slight angular displacement of said counterweight.

11. Means for damping torsional vibrations in a shaft including, a rotating mass driven by said shaft in either direction through non-metallic energy absorbing material, said material transmitting the driving force by being compressed.

12. In a crank shaft having a crank arm, an inertia mass rotatable with the crank shaft in the plane of the arm and movable relatively thereto in response to inertia forces.

13. In a crank shaft having a crank arm, an inertia mass on the shaft adjacent said arm and movable relatively thereto, and resilient means directly connecting said mass and arm to resist said relative movement.

14. In a crank shaft having a crank arm, an inertia mass movable relatively to the shaft in the plane of said arm and resilient means between the mass and said arm opposing relative movement in either direction.

15. In a crank shaft, a mass, means to movably mount the mass on said shaft for rotation about an axis fixed in relation to the shaft, and resilient non-metallic energy absorbing means between said shaft and said mass opposing said movement.

16. In a crank shaft having a crank throw, an inertia member movably mounted on said shaft adjacent said throw to rotate about an axis fixed in relation to the shaft, and yieldable means directly connecting said member to said throw.

17. In a crank shaft having a crank arm, an inertia mass mounted on said shaft in the plane of said arm and movable relatively thereto, and resilient means between the crank arm and the mass to limit said relative movement.

18. In a crank shaft having a crank arm, an inertia mass mounted on said shaft in the plane of said arm and movable relatively thereto, and means to yieldably oppose said relative movement.

19. In a crank shaft having a crank throw, a mass movably mounted adjacent said throw, and opposed means yieldably and directly connecting the mass to said throw.

20. In a crank shaft having a crank throw, an inertia mass movably mounted on said shaft adjacent said throw, and yieldable means abutting said mass and throw for opposing relative movement in either direction of rotation.

21. In a crank shaft having a crank arm, a mass movably mounted in the plane of said arm, and adjustable yielding means between said arm and said mass opposing relative movement therebetween.

22. In a crank shaft having a crank arm, an inertia mass in the plane of said arm and movable relatively thereto, yieldable means between said arm and said mass, and means to adjust the resistance of said yieldable means.

23. In a crank shaft having a crank arm, an inertia mass in the plane of said arm and movable relatively thereto, yieldable means carried by said mass to resist said relative movement, and means on said mass to adjust the resistance of said yieldable means.

24. In a crank shaft having a crank arm, a mass surrounding said arm in the plane thereof, and movable relatively thereto during operation of said shaft in response to torsional vibrations of the shaft.

25. The combination with a crank shaft of a counter-weight therefor, and means associated with the counter-weight to damp torsional vibration in said shaft.

26. The combination with a crank shaft of a vibration damper including an inertia member associated with friction damping means, said inertia member being disposed to counter-balance a crank of said crank shaft.

27. In an internal combustion engine, the combination of a vibration damper and a counter-weight, said counter-weight forming the inertia member of said vibration damper.

28. In an internal combustion engine, a crank shaft, and a combined vibration damper and counter-weight for said crank shaft.

29. In an internal combustion engine and in combination with the crank shaft thereof, an inertia member movable relative to said crank shaft, and yieldable means of energy absorbing material including rubber connected between the crank shaft and the inertia member to distort in response to said relative movement.

30. A vibration damper for crank shafts comprising an inertia member movable relative to the shaft, and a member of energy absorbing material including rubber deformable in response to said relative movement.

31. A vibration damper for crank shafts comprising an inertia member movable relative to the shaft, and yieldable means connected between said shaft and inertia member and including rubber, adapted to absorb energy upon deformation in response to said movement.

32. A vibration damper comprising a relatively movable inertia member including rubber deformable in response to said relative movement.

In testimony whereof I hereto affix my signature.

CHARLES R. SHORT.